(No Model.)
W. H. STRATTON.
VALVE FOR AUTOMATIC DRY PIPE FIRE EXTINGUISHERS.
No. 489,341. Patented Jan. 3, 1893.
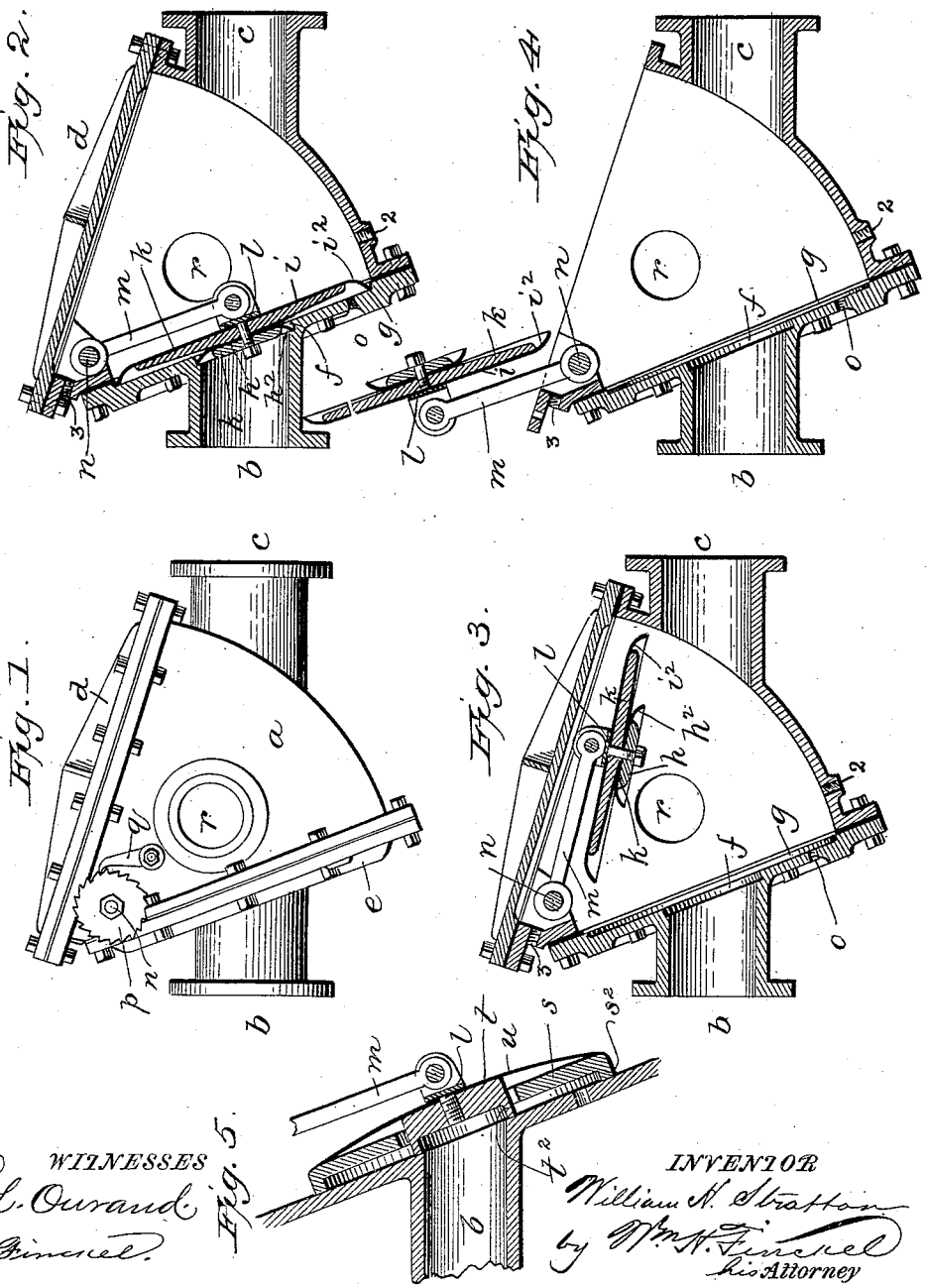
WITNESSES
F. L. Ourand
E. A. Fincel
INVENTOR
William H. Stratton
by Wm. H. Fincel
his Attorney

UNITED STATES PATENT OFFICE.

WILLIAM H. STRATTON, OF PROVIDENCE, RHODE ISLAND.

VALVE FOR AUTOMATIC DRY-PIPE FIRE-EXTINGUISHERS.

SPECIFICATION forming part of Letters Patent No. 489,341, dated January 3, 1893.

Application filed August 21, 1891. Renewed December 7, 1892. Serial No. 454,397. (No model.)

*To all whom it may concern:*

Be it known that I, WILLIAM H. STRATTON, a citizen of the United States, residing at Providence, in the county of Providence and State of Rhode Island, have invented a certain new and useful Improvement in Valves for Automatic Dry-Pipe Fire-Extinguishers, of which the following is a full, clear, and exact description.

This invention relates to the water inlet valve for dry-pipe fire extinguishing systems.

In my invention I employ a valve of differential areas to admit of the air-pressure in the distributing pipe closing the valve against the greater water-pressure in the inlet-pipe, and holding it closed until the air-pressure escapes. This valve I construct as a flexible device which yields sufficiently under the pressure of the air in the distributing pipes to be more firmly seated. The valve is arranged in a suitable case, and may be provided with checking apparatus.

I will describe first the principle of my invention and the best manner in which I have contemplated applying that principle, and then will particularly point out and distinctly claim the part or improvement which I claim as my invention.

In the accompanying drawings illustrating my invention, in the several figures of which like parts are similarly designated, Figure 1 is a side elevation. Fig. 2 a longitudinal section with the valve closed. Fig. 3 is a similar view with the valve open. Fig. 4 is a similar section with the head removed and the valve turned out of the casing, and Fig. 5 is a sectional diagram of a modification.

The casing or shell $a$ may be of any approved or convenient construction, preferably in the shape of a sector of a circular box, and it is supplied with the flanged opening $b$ for connection with the water-supply, and also is supplied with the flanged opening $c$ for connection with the distributing pipes. Both ends of the casing are open their full width and length, and are supplied with removable caps or heads $d$ and $e$ to obtain access to the interior for inspection, cleaning and repair purposes. The head $e$ is provided with the rabbeted valve-seats $f$ and $g$.

The valve is composed of a disk $h$, having the dished rim $h^2$, a similar disk $i$, having the dished rim $i^2$, and the annular washers $k$ and $k^2$, all being held together by an eye-bolt $l$. This eye-bolt $l$ serves the additional purpose of receiving the link $m$ by which the valve is hinged to the shell, said link for this last purpose being secured to a shaft $n$ having bearings in the shell. The disks $h$ and $i$ are made of flexible metal, say, hard spun brass. Their rims fit, respectively, in the seats $f$ and $g$. As pressure is applied to them these rims tend to straighten out and hence the more fully and tightly seat the valve by crowding its two rims into their respective rabbeted seats, without liability of buckling. These disks constitute a double valve so that should one of them leak by reason of a foreign body getting beneath it, the other one will be tight, and they have this function in addition to their function incident to their difference in area. The washers $k$ and $k^2$ may be of cast metal, or other material which will stiffen or reinforce the bodies of the disks. The areas of the disks $h$ and $i$ may be, respectively, as one to three for all practical purposes, the larger disk receiving the air pressure directly. The head $e$ of the shell may have the vents $o$ leading from the space between the two disks of the valve, to permit the escape of any water leaking past the disk $h$, and also to permit the escape of any air leaking past the disk $i$, thereby preventing the neutralizing of the effect of the differential areas and thus destroying the relative effective pressures by an equilibrium. The shaft $n$ may extend laterally beyond the shell, and there may be provided with a ratchet wheel $p$ which is engaged by a pawl $q$, so that when the valve is once opened whether much or little, there will be no danger of its being closed by back pressure or the weight of the column of water above it, the engagement of the pawl and ratchet preventing such closing. The shaft may also be provided with connections to an alarm mechanism of usual and approved construction, not shown.

A glass eye or peep-hole $r$ may be provided in one or both sides of the shell in order to observe the condition of the valve.

In Fig. 5 I show a modification. Instead of the rabbeted seat I use a plane or flat seat, and instead of the flexible disks I use a rigid disk $s$ having an annular rim flange $s^2$ and a central opening $o^3$ in which is arranged a sort of piston $t$ having an annular flange $t^2$. The valve $t$ is movably connected to the disk $s$ by a flexible medium $u$ susceptible to pressure. The flange $s^2$ seats upon the seat while the flange $t^2$ covers and surrounds immediately the water way in the seat.

There may be provided holes 2 and 3 in the casing for the reception of drip cocks for draining the valve when desired. Only one drip cock is needed and that will be placed in the lowermost part of the casing, according to the arrangement of the valve.

What I claim is:—

1. An automatic inlet valve specially designed for use in connection with dry-pipe systems of automatic sprinklers, composed of a shell, valve seats, and valves composed of two members differential in area and united by a common medium and movable flexibly with relation to one another and thus seating independently and also conjointly, substantially as described.

2. An inlet-valve specially designed for use in automatic fire extinguishers, composed of a shell constructed with valve seats, and a valve constructed of disks of stiff but flexible material of differential area and having dished rims to fit the said seats more or less tightly in accordance with the degree of pressure exerted thereupon, substantially as described.

3. The combination with the shell having seats, of a valve composed of disks of flexible material and of unequal diameters, and with dished rims to fit said seats, and reinforcing washers, substantially as described.

4. The combination with a shell having seats, of a valve composed of flexible disks of different diameter and having dished rims, stiffening washers therefor, and a bolt for connecting the disks and washers, substantially as described.

In testimony whereof I have hereunto set my hand this 17th day of August, A. D. 1891.

WILLIAM H. STRATTON.

Witnesses:
F. A. WALDRON, Jr.,
ANDREW B. PATTON.